(12) United States Patent
Ghosh et al.

(10) Patent No.: US 9,729,284 B2
(45) Date of Patent: Aug. 8, 2017

(54) HIGH-EFFICIENCY WI-FI (HEW) STATION AND ACCESS POINT (AP) AND METHOD FOR RESOURCE ALLOCATION SIGNALING

(71) Applicant: Intel IP Corporation, Santa Clara, CA (US)

(72) Inventors: Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 42 days.

(21) Appl. No.: 14/669,150

(22) Filed: Mar. 26, 2015

(65) Prior Publication Data
US 2016/0286533 A1    Sep. 29, 2016

(51) Int. Cl.
  *H04W 72/04*    (2009.01)
  *H04L 5/00*     (2006.01)
  *H04W 84/12*    (2009.01)

(52) U.S. Cl.
  CPC .......... *H04L 5/0023* (2013.01); *H04L 5/0007* (2013.01); *H04W 72/0453* (2013.01); *H04W 84/12* (2013.01)

(58) Field of Classification Search
  None
  See application file for complete search history.

(56) References Cited

U.S. PATENT DOCUMENTS

| | | |
|---|---|---|
| 2010/0254332 A1 | 10/2010 | Cho et al. |
| 2014/0098777 A1 | 4/2014 | Lim et al. |
| 2014/0328264 A1 | 11/2014 | Merlin et al. |
| 2015/0063327 A1 | 3/2015 | Barriac et al. |
| 2015/0207599 A1* | 7/2015 | Kim ...................... H04B 7/2621 370/329 |
| 2016/0066324 A1* | 3/2016 | Li ........................... H04L 69/22 370/338 |

FOREIGN PATENT DOCUMENTS

WO    WO-2014171788 A1    10/2014

OTHER PUBLICATIONS

"International Application Serial No. PCT/US2016/014682, International Search Report mailed May 11, 2016", 3 pgs.
"International Application Serial No. PCT/US2016/014682, Written Opinion mailed May 11, 2016", 5 pgs.

* cited by examiner

*Primary Examiner* — Kodzovi Acolatse
(74) *Attorney, Agent, or Firm* — Schwegman Lundberg & Woessner, P.A.

(57) ABSTRACT

Embodiments of a high-efficiency Wi-Fi (HEW) station, access point (AP), and method for communication in a wireless network are generally described herein. In some embodiments, the HEW AP may transmit a resource allocation message to indicate an allocation of sub-channels to one or more HEW stations for uplink data transmissions. Information included in the resource allocation message may include various indicators related to full or partial allocation of the sub-channels and whether equal allocations are made for each of the HEW stations. A sub-channel mapping block may also be included to indicate how the sub-channels are assigned to the HEW stations. In some cases, the length of the sub-channel mapping block may vary based at least partly on the indicators included in the message.

27 Claims, 6 Drawing Sheets

| | 510 | 511 | 512 | 513 | 514 | 515 | 516 |
|---|---|---|---|---|---|---|---|
| | # HEW STATIONS | PARTIAL (0)/ COMPLETE (1) ALLOCATION | SAME (1)/ DIFFERENT (0) ALLOCATION | RU ALLOCATION (BIT 1) | RU ALLOCATION (BIT 2) | RU ALLOCATION (BITS 3 AND 4) | ADDITIONAL BITMAP |
| 520 | 1 | 1 | 1 | X | X | X | X |
| 521 | 1 | 0 | 1 | 0/1 | 0/1 | X | X |
| 522 | 2 | 1 | 1 | X | X | X | X |
| 523 | 2 | 0 | 0 | 0/1 | 0/1 | X | X |
| 524 | 2 | 0 | 1 | 0/1 | 0/1 | X | X |
| 525 | 2 | 0 | 0 | 0/1 | 0/1 | X | X |
| 526 | 3 | 0 | 0 | X | 0/1 | 00-11 | X |
| 527 | 3 | 1 | 1 | X | X | 00-11 | X |
| 528 | 3 | 0 | 0 | X | 0/1 | 00-11 | X |
| 529 | 4 | 1 | 1 | X | X | X | X |
| 530 | 4 | 1 | 0 | X | X | 00-11 | X |
| 531 | 4 | 0 | 1 | 0/1 | X | X | X |
| 532 | 4 | 0 | 0 | X | X | X | YES |

FIG. 5

| RU ALLOCATION (BIT 1) | RU ALLOCATION (BIT 2) | # SUB-CHANNELS ALLOCATED PER HEW STATION |
|---|---|---|
| 0 | 0 | 1,1 |
| 0 | 1 | 2,2 |
| 1 | 0 | 4,4 |
| 1 | 1 | RESERVED |

600 (SCENARIO FROM ROW 524, FIG. 5)

| RU ALLOCATION (BIT 2) | RU ALLOCATION (BIT 3) | RU ALLOCATION (BIT 4) | # SUB-CHANNELS ALLOCATED PER HEW STATION |
|---|---|---|---|
| 0 | 0 | 0 | 1,2,4 |
| 0 | 0 | 1 | 1,2,2 |
| 0 | 1 | 0 | 1,4,2 |
| 0 | 1 | 1 | 1,4,1 |
| 1 | 0 | 0 | 4,1,1 |
| 1 | 0 | 1 | 4,1,2 |
| 1 | 1 | 0 | 4,2,1 |
| 1 | 1 | 1 | 2,4,1 |

620 (SCENARIO FROM ROW 526, FIG. 5)

| RU ALLOCATION (BIT 3) | RU ALLOCATION (BIT 4) | # SUB-CHANNELS ALLOCATED PER HEW STATION |
|---|---|---|
| 0 | 0 | 1,1,1 |
| 0 | 1 | 2,2,2 |
| 1 | 0 | RESERVED |
| 1 | 1 | RESERVED |

640 (SCENARIO FROM ROW 528, FIG. 5)

FIG. 6

HIGH-EFFICIENCY WI-FI (HEW) STATION AND ACCESS POINT (AP) AND METHOD FOR RESOURCE ALLOCATION SIGNALING

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11 ac standard or the IEEE 802.11ax SIG (named DensiFi). Some embodiments relate to high-efficiency (HE) wireless or high-efficiency WLAN (HEW) communications. Some embodiments relate to multi-user (MU) multiple-input multiple-output (MIMO) communications and orthogonal frequency division multiple access (OFDMA) communication techniques. Some embodiments relate to resource allocation and signaling of such.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

BRIEF DESCRIPTION OF THE DRAWINGS

FIG. 5 illustrates an example of parameters for an HEW SIG-B signaling message in accordance with some embodiments;

FIG. 6 illustrates additional examples of parameters for an HEW SIG-B signaling message in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
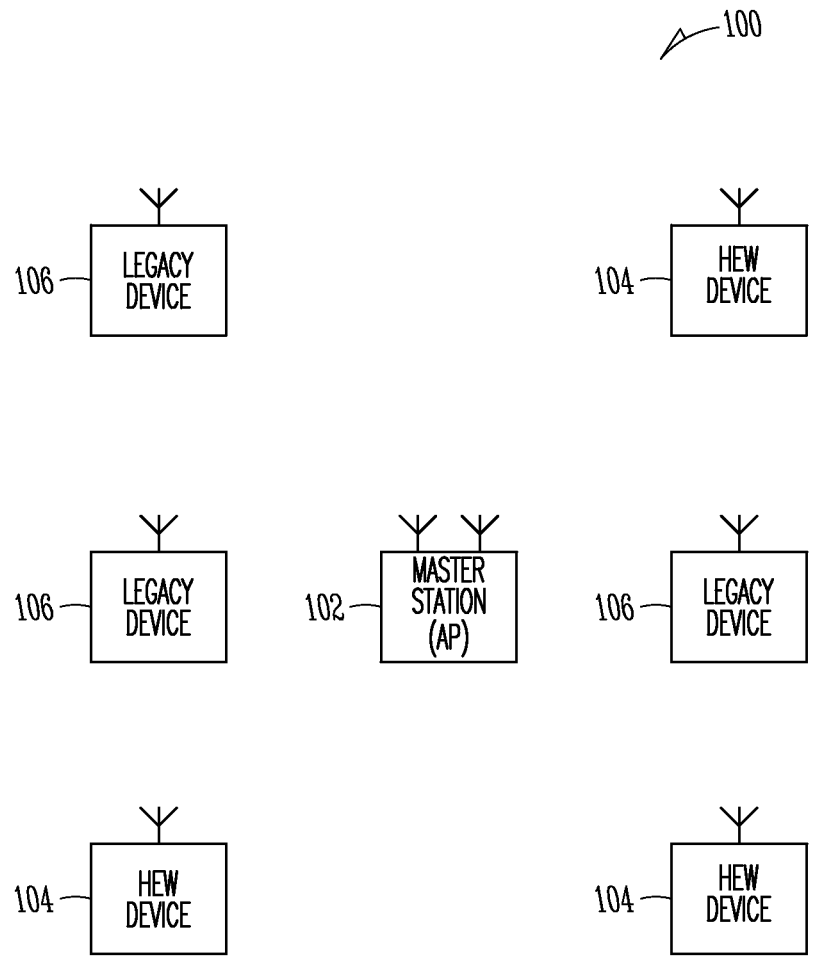
FIG. 1 illustrates a High Efficiency Wi-Fi (HEW) network in accordance with some embodiments.

FIG. 1 illustrates a High Efficiency (HE) Wi-Fi (HEW) network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, legacy stations 106 may refrain from communicating. In some embodiments, the master-sync transmission may be referred to as a control and schedule transmission.

In some embodiments, the HEW AP 102 may receive uplink bandwidth request messages from one or more HEW stations 104, and may allocate uplink transmission resources in response. The HEW AP 102 may transmit, to the HEW stations 104, a resource allocation message that indicates an allocation of sub-channels for uplink data transmissions by the HEW stations 104. The HEW stations 104 may transmit uplink data signals to the HEW AP 102 according to the allocation. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with legacy stations 106 in accordance with legacy IEEE 802.11 communication techniques. In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wi-Fi operation.

Figure 2:
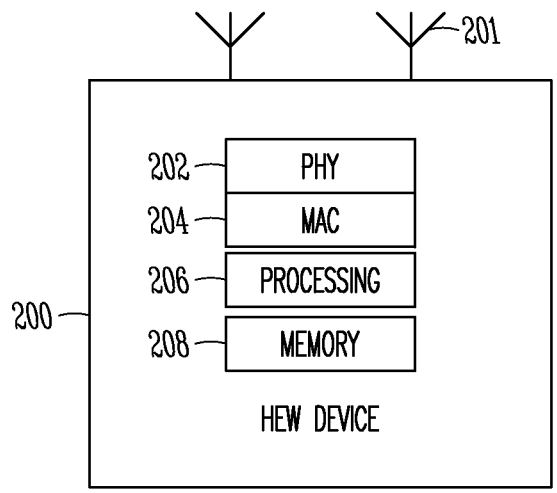
FIG. 2 illustrates an HEW device in accordance with some embodiments.

FIG. 2 illustrates an HEW device in accordance with some embodiments. HEW device 200 may be an HEW compliant device that may be arranged to communicate with one or more other HEW devices, such as HEW stations and/or a master station, as well as communicate with legacy devices. HEW device 200 may be suitable for operating as master station or an HEW station. In accordance with embodiments, HEW device 200 may include, among other things, physical layer (PHY) circuitry 202 and medium-access control layer circuitry (MAC) 204. PHY 202 and MAC 204 may be HEW compliant layers and may also be compliant with one or more legacy IEEE 802.11 standards. PHY 202 may be arranged to transmit HEW frames. HEW device 200 may also include other processing circuitry 206 and memory 208 configured to perform the various operations described herein.

In accordance with some embodiments, the MAC 204 may be arranged to contend for a wireless medium during a contention period to receive control of the medium for the HEW control period and configure an HEW frame. The PHY 202 may be arranged to transmit the HEW frame as discussed above. The PHY 202 may also be arranged to receive an HEW frame from HEW stations. MAC 204 may also be arranged to perform transmitting and receiving operations through the PHY 202. The PHY 202 may include circuitry for modulation/demodulation, upconversion and/or downconversion, filtering, amplification, etc. In some embodiments, the processing circuitry 206 may include one or more processors. In some embodiments, two or more antennas may be coupled to the physical layer circuitry arranged for sending and receiving signals including transmission of the HEW frame. The memory 208 may store information for configuring the processing circuitry 206 to perform operations for configuring and transmitting HEW frames and performing the various operations described herein.

In some embodiments, the HEW device 200 may be configured to communicate using orthogonal frequency division multiplexing (OFDM) communication signals over a multicarrier communication channel. In some embodiments, HEW device 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 200 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 200 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, HEW device 200 may include one or more of a keyboard, a display, a non-volatile memory port, multiple antennas, a graphics processor, an application processor, speakers, and other mobile device elements. The display may be an LCD screen including a touch screen.

The antennas 201 of HEW device 200 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result between each of antennas and the antennas of a transmitting station.

Although HEW device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 200 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Embodiments disclosed herein provide two preamble formats for High Efficiency (HE) Wireless LAN standards specification that is under development in the IEEE Task Group 11ax (TGax).

In accordance with embodiments, the HEW AP 102 may transmit a resource allocation message to indicate an allocation of sub-channels to one or more HEW stations 104 for uplink data transmissions. Information included in the resource allocation message may include various indicators related to full or partial allocation of the sub-channels and whether equal allocations are made for each of the HEW stations 104. A sub-channel mapping block may also be included as a mapping function between allocated sub-channels and the HEW stations 104. In some cases, the length of the sub-channel mapping block may vary based at least partly on the indicators included in the message. These embodiments will be described in more detail below.

Figure 3:
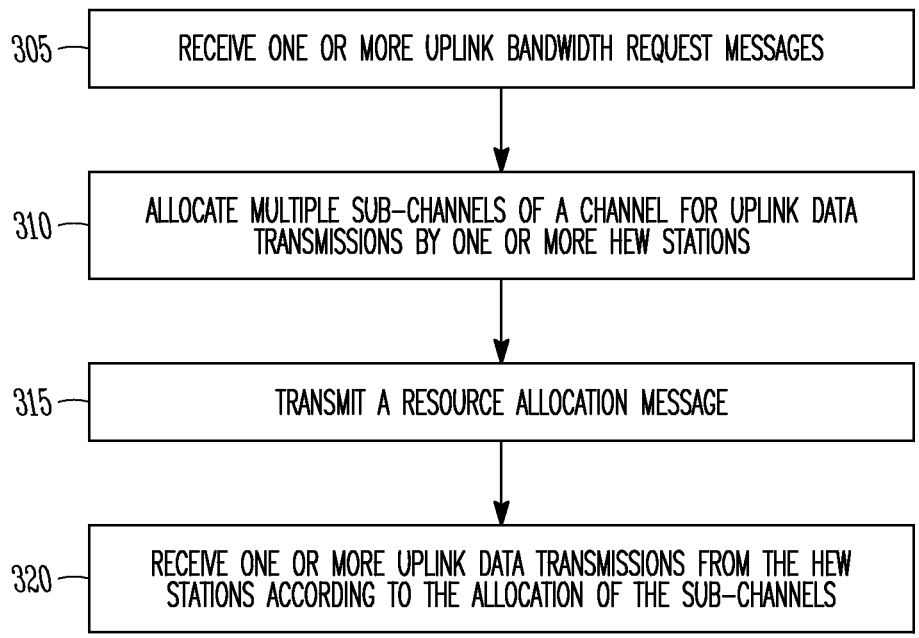
FIG. 3 illustrates the operation of a method of resource allocation signaling in accordance with some embodiments.

FIG. 3 illustrates the operation of a method of resource allocation signaling in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-7, although it is understood that the method 300 may be practiced with any other suitable systems, interfaces and components.

In addition, while the method 300 and other methods described herein may refer to HEW stations 104 and HEW APs 102 operating in accordance with 802.11 or other standards, embodiments of those methods are not limited to just those HEW stations 104 or HEW APs 102 and may also be practiced on other mobile devices, such as a user station (STA), an Evolved Node-B (eNB) or User Equipment (UE). The method 300 and other methods described herein may also be practiced by wireless devices configured to operate in other suitable types of wireless communication systems, including systems configured to operate according to various Third Generation Partnership Project (3GPP) Long Term Evolution (LTE) standards.

In some embodiments, a channel may be used for downlink transmission by the HEW AP 102 and for uplink transmissions by the HEW stations 104. That is, a time-division duplex (TDD) format may be used. In some cases, the channel may include multiple sub-channels or may be divided into multiple sub-channels for the uplink transmissions to accommodate multiple access for multiple HEW stations 104. The downlink transmissions may or may not utilize the same format. The sub-channels may span or may comprise a predetermined bandwidth. As an example, the sub-channels may each span 2.5 MHz, the channel may span 20 MHz, and the channel may include eight sub-channels. As another example, the sub-channels may each span 2.03125 MHz, the channel may span 20 MHz, and the channel may include eight or nine sub-channels. These examples are not limiting, however, and any suitable frequency span for the sub-channels may be used. It should be noted that reference may be made to a 2.03125 MHz sub-channel for illustrative purposes. Such references are not limiting, however, as a 2.5 MHz sub-channel, a 2.0 MHz sub-channel or a sub-channel of another size may also be used in some cases. In some embodiments, the frequency span for the sub-channel may be based on a value included in an 802.11 standard (such as 802.1 lax), a 3GPP standard or other standard.

In some embodiments, the sub-channels may comprise multiple sub-carriers. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. Although not limited as such, the sub-carriers may be used for transmission and/or reception of OFDM or OFDMA signals.

At operation 305 of the method 300, one or more uplink bandwidth request messages may be received at the HEW AP 102. The messages may include one or more station IDs or other identifiers associated with HEW stations 104 requesting resources for uplink transmissions. The messages may also include other related information, including a size of data to be transmitted, a desired data transmission rate or other information. It should be noted that the reception of the messages may occur over any suitable time interval, and is not limited to reception during a same control period. That is, some of the messages may arrive at the HEW AP 102 during different control periods in some cases. As an example, the control period may be a period associated with a random access procedure in which HEW stations 104 may transmit control messages, such as access requests, which may include the uplink bandwidth request messages.

At operation 310, the HEW AP 102 may allocate, based at least partly on the uplink bandwidth request messages, one or more sub-channels of a channel for uplink data transmissions by one or more HEW stations 104. Although not limited as such, the allocation may be for uplink data transmissions intended to occur during a particular uplink data transmission period. The uplink data transmissions may also be restricted to the uplink data transmission period in some cases, although this is not limiting.

The allocation may be performed for HEW stations 104 that have requested uplink data resources in a current or previous time period, although the scope of embodiments is not limited in this respect. Various factors may be considered by the HEW AP 102 as part of the allocation process. As an example, the HEW AP 102 may allocate all of the sub-channels in the channel or may allocate just a portion of the sub-channels. As another example, the HEW AP 102 may or may not allocate an equal number of sub-channels to each HEW station 104 receiving allocations. As another example, the allocations to each HEW station 104 may or may not include contiguous sub-carriers.

At operation 315, the HEW AP 102 may transmit a resource allocation message to indicate an allocation of at least a portion of a group of sub-channels to one or more HEW stations 104 for uplink data transmissions. As an example, the resource allocation message may be transmitted as part of an HEW SIG-B signaling message that also includes station IDs for each HEW station 104 to which resources are allocated. That is, each HEW station 104 may be associated with a station ID that is included in the HEW SIG-B signaling message. For instance, at least one of the uplink bandwidth request messages previously described may include a first station ID associated with a first HEW station 104. The first station ID may be included in the resource allocation message when uplink resources are allocated to the first HEW station 104.

It should be noted that the resource allocation message is not limited to transmission as part of the HEW SIG-B signaling message. The resource allocation message may also be transmitted as part of another type of message or may be an individual or stand-alone message in some cases. In some embodiments, the HEW SIG-B signaling message may be transmitted by the HEW AP 102 in the channel.

In some embodiments, the resource allocation message may include a partial bandwidth indicator to indicate either a partial allocation or a full allocation of the group of sub-channels. That is, the partial bandwidth indicator may be based on whether all sub-channels comprising the channel are allocated. As an example, when eight sub-channels comprise the channel, allocation of eight sub-channels may be a full allocation while allocation of fewer than eight sub-channels may be a partial allocation.

In some embodiments, the resource allocation message may further include an equal allocation indicator to indicate allocation of an equal number of sub-channels to each of the HEW stations 104. That is, the equal allocation indicator may be based on whether each HEW station 104 is allocated an equal number of sub-channels. As an example of an equal allocation case, all eight sub-channels of the channel may be allocated to a first and a second HEW station 104 such that each is allocated four sub-channels. As an example of unequal allocation, all eight sub-channels may be allocated to three HEW stations 104 such that a first HEW station 104 is allocated four sub-channels while the two other HEW stations 104 each are allocated two sub-channels.

In some embodiments, the resource allocation message may further include a sub-channel mapping block that indicates a mapping between allocated sub-channels and the HEW stations 104 to which sub-channels are allocated. A length of the sub-channel mapping block may be at least partly based on one or more of the partial bandwidth indicator, the equal allocation indicator, and a number of HEW stations 104 to which the sub-channels are allocated. As an example, the length of the sub-channel mapping block may vary based at least partly on the partial bandwidth indicator, the equal allocation indicator, and the number of HEW stations 104. Accordingly, the resource allocation message may be a variable length message, with the length depending on the partial bandwidth indicator, the equal allocation indicator, and the number of HEW stations 104.

In some embodiments, values of the sub-channel mapping block used in the resource allocation message may correspond to a set of predetermined mappings between the allocated sub-channels and the HEW stations 104. The set of predetermined mappings may be based at least partly on the partial bandwidth indicator, the equal allocation indicator, and a number of HEW stations 104 to which the sub-channels are allocated. Accordingly, a particular set of predetermined mappings may be associated with a particular combination of values for these indicators and the number of HEW stations 104. Therefore, multiple sets of predetermined mappings may be used, and each may be associated with a different combination of values for these indicators and the number of HEW stations 104. The sets of predetermined mappings may be known to both the HEW AP 102 and the HEW stations 104. In some cases, the sets may be included in an 802.11ax standard or other 802.11 or other standard.

Figure 4:
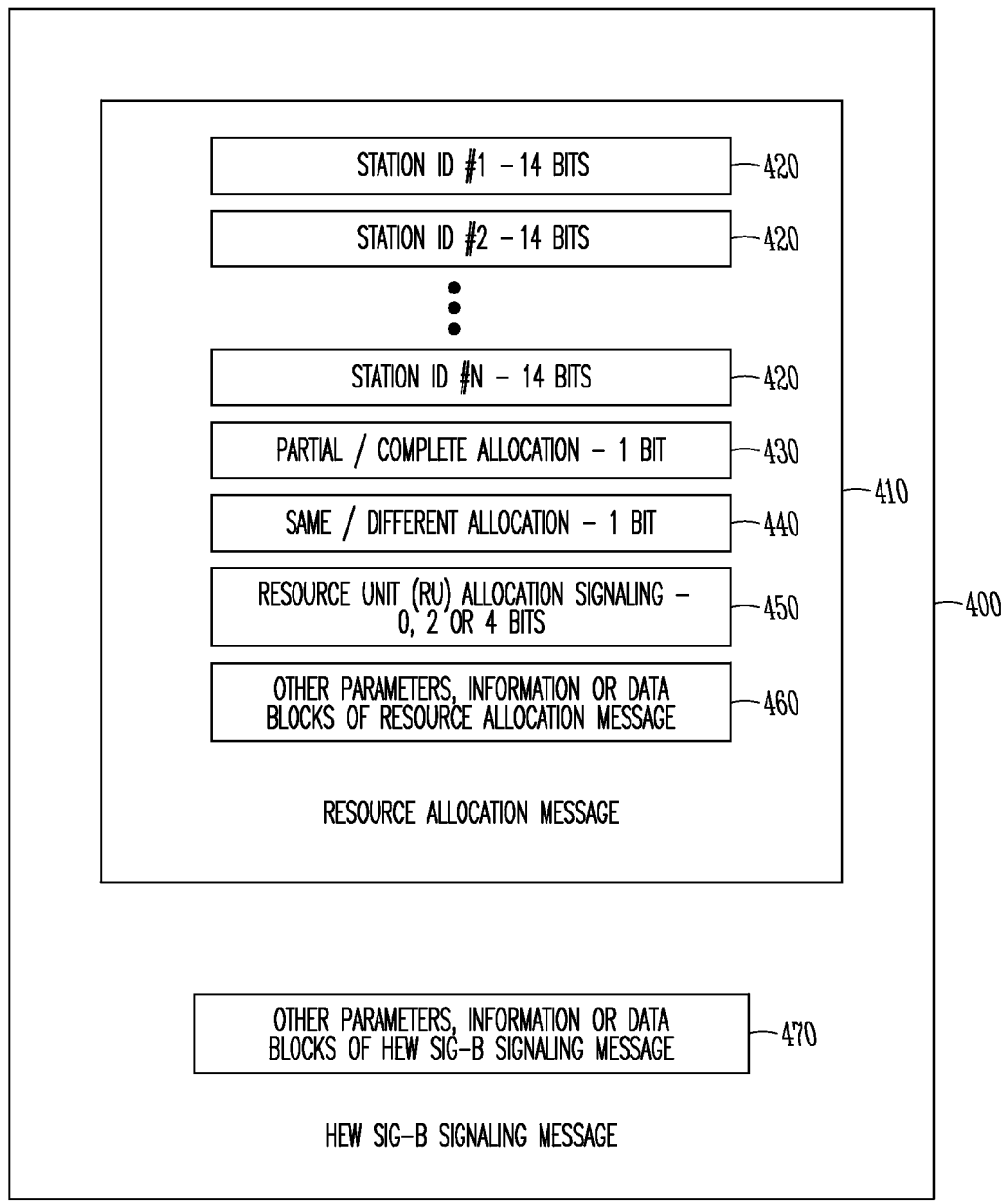
FIG. 4 illustrates an example of an HEW SIG-B signaling message in accordance with some embodiments.

FIG. 4 illustrates an example of an HEW SIG-B signaling message in accordance with some embodiments. The HEW SIG-B signaling message 400 may include the resource allocation message 410, which may include various parameters and information as shown in FIG. 4. It should be noted that embodiments are not limited by the ordering, format or presentation of the parameters and information as shown in FIG. 4. In addition, some embodiments of the resource allocation message 410 and/or the HEW SIG-B signaling message 400 may or may not include some or all of the parameters and information shown, and may also include additional parameters and information not shown in FIG. 4.

The resource allocation message 410 may include stations IDs 420 of the HEW stations 104 to which resources are allocated. The number of stations IDs 420 may vary between 1 and N, and may be the same as the number of HEW stations 104 to which resources are allocated. As a non-limiting example, N may take the value of 8 as previously described. The station IDs 420 are not limited to the example format of 14 bits shown in FIG. 4.

The resource allocation message 410 may also include a "partial/complete allocation" parameter 430, which may include one bit, but is not limited as such. The partial/complete allocation parameter 430 may be similar to or the same as the partial bandwidth indicator previously described. The resource allocation message 410 may include a "same/different allocation" parameter 440, which may include one bit, but is not limited as such. The same/different allocation parameter 440 may be similar to or the same as the equal allocation indicator previously described. The resource allocation message 410 may also include a "Resource Unit (RU) Allocation Signaling" field 430. As an example, the size of the RU Allocation Signaling field 430 may vary between 0, 2 or 4 bits. However, embodiments are not limited to these sizes.

The resource allocation message 410 may also include other parameters, information or data blocks 460, which may or may not be related to resource allocation. The HEW SIG-B signaling message 400 may also include other parameters, information or data blocks 470, which may or may not be related to resource allocation. As an example, control information for the resource allocation message 410 or the HEW SIG-B signaling message 400 may be included in 460 or 470. As another example, a number (or count) of station IDs 420 or HEW stations receiving allocations may be included in 460 or 470.

The sub-channel mapping block will now be described in more detail below. As previously described, the sub-channel mapping block may indicate a mapping between allocated sub-channels and the HEW stations 104 to which sub-channels are allocated. An associated set of predetermined mappings and the length of the sub-channel mapping block may be variable. Accordingly, there may be an opportunity or a potential benefit related to reducing the size of the resource allocation message and/or HEW SIG-B signaling message in comparison to other techniques.

In some embodiments, for at least one value of the number of HEW stations 104, a first set of predetermined mappings used when the partial bandwidth indicator indicates partial allocation may be smaller than a second set used when the partial bandwidth indicator indicates full allocation. Accordingly, the reduced size of the first set may result in a reduction in the length of the sub-channel mapping block when the first set is used, in some cases.

In some embodiments, for at least one value of the number of HEW stations 104, a first set of predetermined assignments used when each HEW station 104 is allocated an equal number of the sub-channels may be smaller than a second set used when the HEW stations 104 are allocated different numbers of the sub-channels. Accordingly, the reduced size of the first set may result in a reduction in the length of the sub-channel mapping block when the first set is used, in some cases.

In some embodiments, for at least one value of the number of HEW stations 104, a combined length for the partial bandwidth indicator, the equal allocation indicator, and the sub-channel mapping block may be lower than the number of HEW stations 104. Accordingly, the combined length may be lower than a number of bits used by other techniques that convey the allocation information using a bitmap that includes at least as many bits as the number of HEW stations 104.

In some embodiments, for at least one value of the number of HEW stations 104, the resource allocation message may be compressed in comparison to a second resource allocation message that includes a sub-channel assignment bitmap that includes a bit for each sub-channel in the group of sub-channels. That is, a combined length for the partial bandwidth indicator, the equal allocation indicator, and the sub-channel mapping block may be lower than a length of the sub-channel assignment bitmap.

FIG. 5 illustrates an example of parameters for an HEW SIG-B signaling message in accordance with some embodiments. FIG. 6 illustrates additional examples of parameters for an HEW SIG-B signaling message in accordance with some embodiments. The table 500 is not meant to be an exhaustive listing of scenarios, but the examples included in the table 500 may illustrate concepts described herein. The table 500 may be extended to include additional scenarios in some cases. For instance, the table 500 shows example allocation scenarios for 1, 2, 3 or 4 HEW stations, but may be extended to include other allocation scenarios for 5, 6, 7 or 8 HEW stations. In addition, some of the scenarios shown in FIG. 5 may be excluded from some embodiments.

Each row 520-532 represents a scenario described by a different combination of the various parameters described earlier and in FIG. 4. The number of HEW stations is shown in column 510. The partial/complete allocation parameter in column 511 takes the values of 0 and 1 for partial and complete allocations, respectively. The same/different allocation parameter in column 512 takes the values of 0 and 1 to indicate allocations of different sizes and same sizes, respectively. In the examples of these two indicators, the assignment of the logical 0 and 1 to the indicated cases are used as examples, and are not limiting.

Column 513 indicates whether or not RU allocation bit #1 is used, while column 514 indicates whether or not RU allocation bit #2 is used. Similarly, column 515 indicates whether or not RU allocation bits #3 and #4 are used. An "x" in a box indicates that the corresponding bit(s) are not used. As a non-limiting example, the scenario in row 526 includes three bits, which are the RU allocation bits #2, #3, and #4. The RU allocation bit #1 is excluded in this particular example. Column 516 indicates whether or not an additional bitmap is included.

In a first scenario shown in row 524, two HEW stations 104 receive a partial allocation (column 511 indicator=0) and the same number of sub-channels are allocated to each user (column 512 indicator=1). From columns 513-515, RU allocation bits #1 and #2 are used. Referring to FIG. 6, table 600 is associated with this scenario in row 524. Accordingly, three allocations are shown in column 605 for RU allocation bits #1 and #2 in columns 601, 602. When the bits take the values (0,0) in the first row 606, each of the two HEW stations 104 receives one sub-channel. When the bits take the values (0,1) in the second row 607, each of the two HEW stations 104 receives two sub-channels. When the bits take the values (1,0) in the third row 607, each of the two HEW stations 104 receives four sub-channels. It should be noted that two bits may be mapped to four scenarios and that only three scenarios are actually used in this example. Therefore the pair of values (1,1) in row 609 does not define a scenario in this example, and may be considered as "reserved" or "undefined" accordingly. It should also be noted that if more than four scenarios are used, more than two bits would be needed. In addition, the size of the table 600 (rows and columns) may be a function of the partial/complete allocation parameter in column 511, the same/different allocation parameter in column 512, and the number of HEW stations in column 510.

From this scenario shown in row 524, it should be noted that the sub-channel mapping block previously described is the pair of RU allocation bits #1 and #2. Possible values of the sub-channel mapping block are (0,0), (0,1) and (1,0). The set of predetermined mappings between the allocated sub-channels and the HEW stations 104 are the three entries shown in column 605, rows 606-608. That is, each entry of column 605 represents a predetermined mapping.

Continuing the scenario from row 524, an example assignment will be given when the allocation of sub-channels is contiguous and begins with sub-channel #1 from a group of sub-channels #1-#8. In row 606, when each HEW station 104 receives one sub-channel, the first HEW station 104 receives sub-channel #1 and the second HEW station 104 receives sub-channel #2. In row 607, when each HEW station 104 receives two sub-channels, the first HEW station 104 receives sub-channels #1 and #2, while the second HEW station 104 receives sub-channels #3 and #4. In row 608, when each HEW station 104 receives four sub-channels, the first HEW station 104 receives sub-channels #1-#4, while the second HEW station 104 receives sub-channels #5-#8.

In a second scenario shown in row 526, three HEW stations 104 receive a partial allocation (column 511 indicator=0) and different numbers of sub-channels are allocated to each user (column 512 indicator=0). From columns 513-515, RU allocation bits #2, #3, and #4 are used. Referring to FIG. 6, table 620 is associated with this scenario in row 526. Accordingly, eight allocations are shown in column 625 for RU allocation bits #2, #3, and #4 in columns 621-623. When the bits take the values (0,0,0) in the first row 626, the first HEW station 104 receives one sub-channel, the second HEW station 104 receives two sub-channels, and the third HEW station 104 receives four sub-channels. When the bits take the values (0,0,1) in the second row 627, the first HEW station 104 receives one sub-channel, the second HEW station 104 receives two sub-channels, and the third HEW station 104 receives two sub-channels. Additional cases 628-633 are listed in the table 620. It should be noted that in all the cases shown, fewer than the eight possible sub-channels are allocated (partial allocation) and the three HEW stations 104 are allocated different numbers of sub-channels.

It should be noted that the set of mappings shown in column 625 of table 620 is larger than the set of mappings shown in column 605 of table 600. It can be seen from table 500 that the number of RU allocation bits in columns 513-515 is different for different scenarios (rows). Accordingly the size of the set of mappings in different scenarios may also be different, as shown in the examples of FIG. 6. In addition, the example logic and table listings shown in FIG. 5 and FIG. 6 are presented for illustrative purposes and are not limiting. That is, a scenario that may be used as a mapping is not limited to a particular row or column or table, even if the scenario is presented in a particular row or column or table in FIG. 5 and FIG. 6.

In a third scenario shown in row 528, three HEW stations 104 receive a partial allocation (column 511 indicator=0) and the same number of sub-channels are allocated to each user (column 512 indicator=1). From columns 513-515, RU allocation bits #3 and #4 are used. Referring to FIG. 6, table 640 is associated with this scenario in row 528. Accordingly, two allocations are shown in column 645 for RU allocation bits #3 and #4 in columns 641, 642. When the bits take the values (0,0) in the first row 646, each of the three HEW stations 104 receives one sub-channel. When the bits take the values (0,1) in the second row 647, each of the two HEW stations 104 receives two sub-channels. The pair of values (1,0) in row 648 does not define a scenario in this example, and may be considered as "reserved" or "undefined" accordingly. Similarly, the pair of values (1,1) in row 649 also does not define a scenario in this example and is denoted as "reserved." It should be noted that the size of the table 640 (rows and columns) is different from the size of the table 620. The two tables 620, 640 are both associated with three HEW stations and partial resource allocation. However, table 620 is associated with allocation of different numbers of sub-channels to each HEW station 104 while table 640 is associated with equal resource allocation to each HEW station 104.

Returning to the method 300, at operation 320, one or more uplink data transmissions or uplink data signals may be received at the HEW AP 102 from one or more of the HEW stations 104 according to the allocation of the sub-channels in the resource allocation message. The uplink data transmissions may be performed in the channel, as previously described. In some embodiments, the uplink data transmissions may include one or more orthogonal frequency division multiple-access (OFDMA) signals. These embodiments are not limiting, however, as other suitable formats may be used for the uplink data transmissions. In addition, embodiments are not limited to reception of uplink data signals, as uplink control signals or other uplink signals may also be received in some cases.

Figure 7:
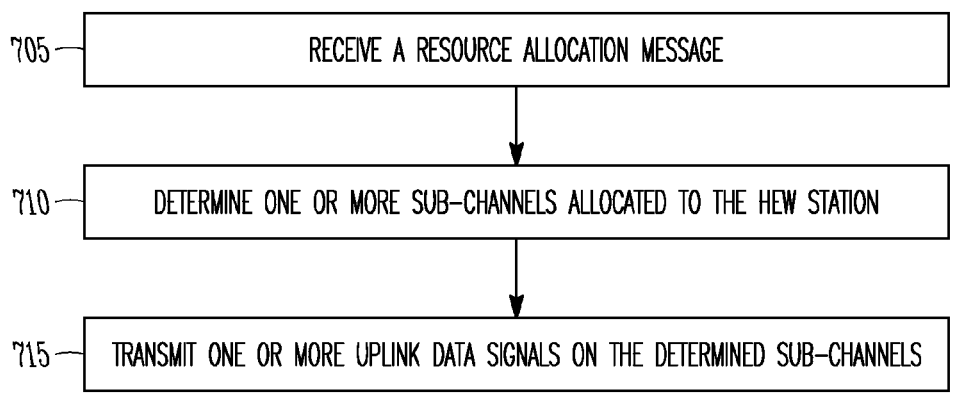
FIG. 7 illustrates the operation of another method of resource allocation signaling in accordance with some embodiments.

FIG. 7 illustrates the operation of another method of resource allocation signaling in accordance with some embodiments. As mentioned previously regarding the method 300, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6, although it is understood that the method 700 may be practiced with any other suitable systems, interfaces and components. In addition, embodiments of the method 700 may refer to eNBs 104, UEs 102, APs, STAs or other wireless or mobile devices.

It should be noted that the method 700 may be practiced at an HEW station 104, and may include exchanging of signals or messages with an HEW AP 102. Similarly, the method 300 may be practiced at the HEW AP 102, and may include exchanging of signals or messages with the HEW station 104. In some cases, operations and techniques described as part of the method 300 may be relevant to the method 700. For instance, an operation of the method 300 may include transmission of a block by the AP 102 while an operation of the method 700 may include reception of the same block or similar block by the HEW station 104. In addition, previous discussion of various concepts may be applicable to the method 700 in some cases, including the sub-channels, resource allocation message, partial bandwidth indicator, equal allocation indicator, sub-channel mapping block, uplink data transmissions and signals, uplink bandwidth request messages, and other concepts. In addition, the message formats shown in FIG. 6 may also be used, in some cases.

At operation 705, the HEW station 104 may receive a resource allocation message from an HEW AP 102 for allocation of at least a portion of a group of sub-channels for uplink data transmission to the HEW AP 102. The HEW station 104 may be included in a group of HEW stations 104 to which sub-channels are allocated. The resource allocation message may include a partial bandwidth indicator of whether all sub-channels in the group are allocated, and may further include a sub-channel mapping block that indicates a mapping between the group of HEW stations 104 and sub-channels allocated to the group of HEW stations 104. In some embodiments, the resource allocation message may further include an equal allocation indicator of whether each HEW station 104 in the group is allocated an equal number of sub-channels.

In some embodiments, a length of the sub-channel mapping block may be based at least partly on the partial bandwidth indicator, the equal allocation indicator, and a number of HEW stations 104 in the group. In some embodiments, values for the sub-channel mapping block correspond to a set of predetermined mappings between the group of HEW stations 104 and the sub-channels allocated to the group of HEW stations 104. The set of predetermined mappings may be based at least partly on the partial bandwidth indicator, the equal allocation indicator, and the number of HEW stations in the group.

At operation 710, one or more sub-channels that are allocated to the HEW station 104 may be determined based on the resource allocation message. The determination may be based on knowledge, at the HEW station 104, of sets of predetermined mappings that may be used at the HEW AP 104 to specify which sub-channels are allocated to the group of HEW stations 104.

At operation 715, one or more uplink data signals may be transmitted on the sub-channels that are determined as allocated for the HEW station 104. In some embodiments, the uplink data signals may include one or more OFDMA signals. In some embodiments, the transmission of the uplink data signals and the reception of the resource allocation message may be performed in the channel. In addition, embodiments are not limited to transmission of uplink data signals, as uplink control signals or other uplink signals may also be transmitted in some cases.

An example of a high-efficiency Wi-Fi (HEW) access point (AP) is disclosed herein. The HEW AP may comprise hardware processing circuitry configured to transmit a resource allocation message to indicate an allocation of at least a portion of a group of sub-channels to one or more HEW stations for uplink data transmissions. The hardware processing circuitry may be further configured to receive one or more uplink data transmissions from the HEW stations. The resource allocation message may include a partial bandwidth indicator to indicate either a partial allocation or a full allocation of the group of sub-channels. The resource allocation message may further include a sub-channel mapping block that indicates a mapping between allocated sub-channels and the HEW stations. A length of the sub-channel mapping block may be at least partly based on the partial bandwidth indicator.

In some examples, the resource allocation message may further include an equal allocation indicator to indicate allocation of an equal number of sub-channels to each of the HEW stations. The length of the sub-channel mapping block may be further based at least partly on the equal allocation indicator. In some examples, values of the sub-channel mapping block used in the resource allocation message may correspond to a set of predetermined mappings between the allocated sub-channels and the HEW stations. In some examples, the set of predetermined mappings may be based at least partly on the partial bandwidth indicator, the equal allocation indicator, and a number of HEW stations to which the sub-channels are allocated.

In some examples, for at least one value of the number of HEW stations, a first set of predetermined mappings used when the partial bandwidth indicator indicates partial allocation may be smaller than a second set used when the partial bandwidth indicator indicates full allocation. In some examples, for at least one value of the number of HEW stations, a first set of predetermined assignments used when each HEW station is allocated an equal number of the sub-channels may be smaller than a second set used when the HEW stations are allocated different numbers of the sub-channels. In some examples, for at least one value of the number of HEW stations, a combined length for the partial bandwidth indicator, the equal allocation indicator, and the sub-channel mapping block may be lower than the number of HEW stations. In some examples, for at least one value of the number of HEW stations, the resource allocation message may be compressed in comparison to a second resource allocation message that includes a sub-channel assignment bitmap that includes a bit for each sub-channel in the group of sub-channels.

In some examples, the resource allocation message may be included in an HEW SIG-B signaling message and each HEW station may be associated with a station ID that is also included in the HEW SIG-B signaling message. In some examples, the transmission of the resource allocation message and the reception of the uplink data transmissions may be performed in a channel that includes the group of sub-channels.

In some examples, the channel may span 20 MHz and the group of sub-channels may include eight sub-channels that each spans 2.03125 MHz. In some examples, the sub-channels may comprise a predetermined bandwidth and may further comprise multiple sub-carriers. In some examples, the uplink data transmissions may include one or more orthogonal frequency division multiple-access (OFDMA) signals. In some examples, the HEW AP may further comprise one or more antennas configured to transmit the resource allocation message and to receive the uplink data transmissions.

An example of a method for communication performed by a high-efficiency Wi-Fi (HEW) access point (AP) is disclosed herein. The method may comprise receiving one or more uplink bandwidth request messages and allocating, based at least partly on the uplink bandwidth request messages, multiple sub-channels of a channel for uplink data transmissions by one or more HEW stations. The method may further comprise transmitting a resource allocation message that includes a partial bandwidth indicator based on whether all sub-channels comprising the channel are allocated. The resource allocation message may further include an equal allocation indicator based on whether each HEW station is allocated an equal number of sub-channels. The resource allocation message may further include a sub-channel mapping block that assigns the allocated sub-channels to the HEW stations. A length of the sub-channel mapping block may vary based at least partly on the partial bandwidth indicator, the equal allocation indicator, and a number of HEW stations.

In some examples, the method may further comprise receiving one or more uplink data transmissions from the HEW stations according to the allocation of the sub-channels. In some examples, at least one of the uplink bandwidth request messages may include a station ID associated with one of the HEW stations to which sub-channels are allocated and the station ID may be included in the resource allocation message. In some examples, values for the sub-channel mapping block used in the resource allocation message may correspond to a set of predetermined mappings for assignment of the allocated sub-channels to the HEW stations. The set of predetermined mappings may be based at least partly on the partial bandwidth indicator, the equal allocation indicator, and the number of HEW stations.

In some examples, for at least one value of the number of HEW stations, a first set of predetermined mappings used when the partial bandwidth indicator indicates partial allocation may be smaller than a second set used when the partial bandwidth indicator indicates full allocation. In some examples, for at least one value of the number of HEW stations, a combined length for the partial bandwidth indicator, the equal allocation indicator, and the sub-channel mapping block may be lower than the number of HEW stations.

In some examples, each HEW station may be associated with a station ID and the resource allocation message may be transmitted as part of an HEW SIG-B signaling message that also includes the station IDs for each HEW station. In some examples, the sub-channels may comprise a predetermined bandwidth and may further comprise multiple sub-carriers.

An example of a non-transitory computer-readable storage medium that stores instructions for execution by one or more processors of a high-efficiency Wi-Fi (HEW) station to perform operations for communication is also disclosed herein. The operations may configure the one or more processors to transmit a resource allocation message to indicate an allocation of at least a portion of a group of sub-channels to one or more HEW stations for uplink data transmissions. The operations may further configure the one or more processors to receive one or more uplink data transmissions from the HEW stations. The resource allocation message may include a partial bandwidth indicator to indicate either a partial allocation or a full allocation of the group of sub-channels. The resource allocation message may further include a sub-channel mapping block that indicates a mapping between allocated sub-channels and the HEW stations. A length of the sub-channel mapping block may be at least partly based on the partial bandwidth indicator. In some examples, the resource allocation message may further include an equal allocation indicator to indicate allocation of an equal number of sub-channels to each of the HEW stations and the length of the sub-channel mapping block may be further based at least partly on the equal allocation indicator.

An example of a high-efficiency Wi-Fi (HEW) station is also disclosed herein. The HEW station may comprise hardware processing circuitry configured to receive a resource allocation message from an access point (AP) for allocation of at least a portion of a group of sub-channels for uplink data transmission to the AP. The HEW station may be included in a group of HEW stations to which sub-channels are allocated. The hardware processing circuitry may be further configured to determine, based on the resource allocation message, one or more sub-channels that are allocated to the HEW station. The hardware processing circuitry may be further configured to transmit one or more uplink data signals on the determined sub-channels. The resource allocation message may include a partial bandwidth indicator of whether all sub-channels in the group are allocated. The resource allocation message may further include a sub-channel mapping block that indicates a mapping between the group of HEW stations and sub-channels allocated to the group of HEW stations. In some examples, the resource allocation message may further include an equal allocation indicator of whether each HEW station in the group is allocated an equal number of sub-channels. A length of the sub-channel mapping block may be based at least partly on the partial bandwidth indicator, the equal allocation indicator, and a number of HEW stations in the group.

In some examples, values for the sub-channel mapping block may correspond to a set of predetermined mappings between the group of HEW stations and the sub-channels allocated to the group of HEW stations. The set of predetermined mappings may be based at least partly on the partial bandwidth indicator, the equal allocation indicator, and the number of HEW stations in the group. In some examples, the resource allocation message may be included in an HEW SIG-B signaling message and each HEW station in the group may be associated with a station ID that is also included in the HEW SIG-B signaling message.

In some examples, the reception of the resource allocation message and the transmission of the uplink data signals may be performed in a channel that spans 20 MHz and includes eight sub-channels that span 2.03125 MHz each. In some examples, the sub-channels may comprise a predetermined bandwidth and may further comprise multiple sub-carriers for transmission of orthogonal frequency division multiple access (OFDMA) signals. In some examples, the HEW station may further comprise one or more antennas configured to receive the resource allocation message and to transmit the uplink data signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP) comprising: memory; and, hardware processing circuitry coupled to the memory, the hardware processing circuitry configured to:
   configure the HE AP to transmit a resource allocation message to indicate an allocation of at least a portion of a group of sub-channels to one or more HE stations for uplink data transmissions; and
   decode one or more uplink data transmissions from the HE stations, wherein the resource allocation message includes a partial bandwidth indicator to indicate either a partial allocation or a full allocation of the group of sub-channels;
   wherein the resource allocation message further includes a sub-channel mapping block that indicates a mapping between allocated sub-channels and the HE stations; and
   wherein a length of the sub-channel mapping block is at least partly based on the partial bandwidth indicator, the resource allocation message further includes an allocation indicator to indicate allocation of an equal number of sub-channels each of the HE stations; and the length of the sub-channel mapping block is further based at least on the allocation indicator.

2. The apparatus of the HE AP according to claim 1, wherein values of the sub-channel mapping block used in the resource allocation message correspond to a set of predetermined mappings between the allocated sub-channels and the HE stations.

3. The apparatus of the HE AP according to claim 2, wherein the set of predetermined mappings is based at least partly on the partial bandwidth indicator, the allocation indicator, and a number of HE stations to which the sub-channels are allocated.

4. The apparatus of the HE AP according to claim 3, wherein for at least one value of the number of HE stations, a first set of predetermined mappings used when the partial bandwidth indicator indicates partial allocation is smaller than a second set used when the partial bandwidth indicator indicates full allocation.

5. The apparatus of the HE AP according to claim 3, wherein for at least one value of the number of HEW stations, a first set of predetermined assignments used when each HE station is allocated an equal number of the sub-channels is smaller than a second set used when the HE stations are allocated different numbers of the sub-channels.

6. The apparatus of the HE AP according to claim 3, wherein for at least one value of the number of HE stations, a combined length for the partial bandwidth indicator, the allocation indicator, and the sub-channel mapping block is lower than the number of HE stations.

7. The apparatus of the HE AP according to claim 3, wherein for at least one value of the number of HE stations, the resource allocation message is compressed in comparison to a second resource allocation message that includes a sub-channel assignment bitmap that includes a bit for each sub-channel in the group of sub-channels.

8. The apparatus of the HE AP according to claim 1, wherein:
   the resource allocation message is included in an HE SIG-B signaling message; and
   each HE station is associated with a station ID that is also included in the HE SIG-B signaling message.

9. The apparatus of the HE AP according to claim 1, wherein the transmission of the resource allocation message and the reception of the uplink data transmissions are performed in a channel that includes the group of sub-channels.

10. The apparatus of the HE AP according to claim 9, wherein the channel spans 20 MHz and the group of sub-channels includes eight sub-channels that each spans 2.03125 MHz.

11. The apparatus of the HE AP according to claim 1, wherein the sub-channels comprise a predetermined bandwidth and further comprise multiple sub-carriers.

12. The apparatus of the HE AP according to claim 1, wherein the uplink data transmissions include one or more orthogonal frequency division multiple-access (OFDMA) signals.

13. The apparatus of the HE AP according to claim 1, the apparatus of the HE AP further comprising one or more antennas configured to transmit the resource allocation message and to receive the uplink data transmissions.

14. A method for communication performed by an apparatus of a high-efficiency (HE) access point (AP), the method comprising:
   receiving one or more uplink bandwidth request messages;
   allocating, based at least partly on the uplink bandwidth request messages, multiple sub-channels of a channel for uplink data transmissions by one or more HE stations; and
   transmitting a resource allocation message that includes a partial bandwidth indicator based on whether all sub-channels comprising the channel are allocated, an allocation indicator based on whether each HEW station is allocated an equal number of sub-channels, and a sub-channel mapping block that assigns the allocated sub-channels to the HE stations, wherein a length of the sub-channel mapping block varies based at least partly on the partial bandwidth indicator, the allocation indicator, and a number of HE stations.

15. The method according to claim 14, the method further comprising receiving one or more uplink data transmissions from the HE stations according to the allocation of the sub-channels.

16. The method according to claim 14, wherein at least one of the uplink bandwidth request messages includes a station ID associated with one of the HE stations to which sub-channels are allocated and the station ID is included in the resource allocation message.

17. The method according to claim 14, wherein:
values for the sub-channel mapping block used in the resource allocation message correspond to a set of predetermined mappings for assignment of the allocated sub-channels to the HEW stations; and
the set of predetermined mappings is based at least partly on the partial bandwidth indicator, the allocation indicator, and the number of HE stations.

18. The method according to claim 17, wherein for at least one value of the number of HEW stations, a first set of predetermined mappings used when the partial bandwidth indicator indicates partial allocation is smaller than a second set used when the partial bandwidth indicator indicates full allocation.

19. The method according to claim 14, wherein:
each HE station is associated with a station ID; and
the resource allocation message is transmitted as part of an HE SIG-B signaling message that also includes the station IDs for each HE station.

20. The method according to claim 14, wherein the sub-channels comprise a predetermined bandwidth and further comprise multiple sub-carriers.

21. A non-transitory computer-readable storage medium that stores instructions for execution by one or more processors of an apparatus of a high-efficiency (HE) station to perform operations for communication, the operations to configure the one or more processors to:
configure the HE AP to transmit a resource allocation message to indicate an allocation of at least a portion of a group of sub-channels to one or more HE stations for uplink data transmissions; and
decode one or more uplink data transmissions from the HE stations, wherein the resource allocation message includes a partial bandwidth indicator to indicate either a partial allocation or a full allocation of the group of sub-channels;
wherein the resource allocation message further includes a sub-channel mapping block that indicates a mapping between allocated sub-channels and the HE stations; and
wherein a length of the sub-channel mapping block is at least partly based on the partial bandwidth indicator, the resource allocation message further includes an allocation indicator to indicate allocation of an equal number of sub-channels to each of the HE stations; and the length of the sub-channel mapping block is further based at least partly on the allocation indicator.

22. An apparatus of a high-efficiency (HE) station comprising: memory; and, hardware processing circuitry coupled to the memory, the hardware processing circuitry configured to:
configure the HE station to receive a resource allocation message from an access point (AP) for allocation of at least a portion of a group of sub-channels for uplink data transmission to the AP, wherein the HE station is included in a group of HE stations to which sub-channels are allocated;
determine, based on the resource allocation message, one or more sub-channels that are a located to the HE station;
transmit one or more uplink data signals on the determined sub-channels, wherein the resource allocation message includes a partial bandwidth indicator of whether all sub-channels in the group are allocated, and further includes a sub-channel mapping block that indicates a mapping between the group of HE stations and sub-channels allocated to the group of HE stations, the resource allocation message further includes an allocation indicator of whether each HEW station in the allocated an equal number of sub-channels; and
a length of the sub-channel mapping block is based at least partly on the partial bandwidth indicator, the allocation indicator, and a number of HEW stations in the group.

23. The apparatus of the HE station according to claim 22, wherein:
values for the sub-channel mapping block correspond to a set of predetermined mappings between the group of HEW stations and the sub-channels allocated to the group of HEW stations; and
the set of predetermined mappings is based at least partly on the partial bandwidth indicator, the allocation indicator, and the number of HEW stations in the group.

24. The apparatus of the HE station according to claim 22, wherein:
the resource allocation message is included in an HEW SIG-B signaling message;
each HEW station in the group is associated with a station ID that is also included in the HEW SIG-B signaling message.

25. The apparatus of the HE station according to claim 22, wherein the reception of the resource allocation message and the transmission of the uplink data signals are performed in a channel that spans 20 MHz and includes eight sub-channels that span 2.03125 MHz each.

26. The apparatus of the HE station according to claim 22, wherein the sub-channels comprise a predetermined bandwidth and further comprise multiple sub-carriers for transmission of orthogonal frequency division multiple access (OFDMA) signals.

27. The apparatus of the HE station according to claim 22, the HEW station further comprising one or more antennas configured to receive the resource allocation message and to transmit the uplink data signals.

* * * * *